United States Patent
Caillot et al.

(10) Patent No.: US 9,821,773 B2
(45) Date of Patent: Nov. 21, 2017

(54) CONNECTING ASSEMBLY FOR A WINDSCREEN WIPER BLADE

(71) Applicant: Valeo Systèmes d'Essuyage, Le Mesnil Saint Denis (FR)

(72) Inventors: Gérald Caillot, Cernay la Ville (FR); Michael Schaeuble, Vaihingen/Enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 512 days.

(21) Appl. No.: 14/276,754

(22) Filed: May 13, 2014

(65) Prior Publication Data
US 2014/0331433 A1 Nov. 13, 2014

(51) Int. Cl.
*B60S 1/40* (2006.01)
*B60S 1/46* (2006.01)
*B60S 1/52* (2006.01)
*B60S 1/38* (2006.01)
B60S 1/48 (2006.01)

(52) U.S. Cl.
CPC ............ *B60S 1/524* (2013.01); *B60S 1/3805* (2013.01); *B60S 1/3862* (2013.01); *B60S 1/4038* (2013.01); *B60S 1/4048* (2013.01); *B60S 1/488* (2013.01); *B60S 2001/4051* (2013.01); *B60S 2001/4058* (2013.01)

(58) Field of Classification Search
CPC .. B60S 1/40; B60S 1/522; B60S 1/524; B60S 1/3862; B60S 1/4038; B60S 1/4048; B60S 1/4045; B60S 2001/4051; B60S 2001/4058; B60S 2001/4061; B60S 1/3805; B60S 1/3425; B60S 1/3429
See application file for complete search history.

(56) References Cited

U.S. PATENT DOCUMENTS 2,974,341 A * 3/1961 Hart ..................... B60S 1/40
                                                    15/250.32
2011/0185531 A1* 8/2011 Egner-Walter ......... B60S 1/381
                                                    15/250.01

FOREIGN PATENT DOCUMENTS

| CN | 102164786 | | 8/2011 |
|----|-----------|---|--------|
| DE | 10 2010 052308 | | 5/2012 |
| DE | 102010052314 A1 | * | 5/2012 |
| DE | 102010056366 A1 | * | 7/2012 |
| GB | 2479709 | | 10/2011 |
| WO | 2008136579 A1 | | 11/2008 |
| WO | 2012072748 A1 | | 6/2012 |

OTHER PUBLICATIONS

The First Office Action issued in Corresponding Chinese Patent Application No. 201410381535.8, dated May 2, 2017 (14 pages).

* cited by examiner

*Primary Examiner* — Gary Graham
(74) *Attorney, Agent, or Firm* — Osha Liang LLP

(57) ABSTRACT

Assembly for the production of a wiping system (1), comprising a terminal part (4) of a wiper arm (3) designed to move a wiper blade (2), and a connecting interface (5) for conveying a liquid to the wiper blade (2), said assembly further comprising one sliding element (6) having a first position for locking a connecting device of the wiper blade (2) on said terminal part (4), and a second position enabling the terminal part (4) and the connecting device to be separated, said sliding element (6) being further able to hang said connecting interface (5) either on the connecting device in the first position or on the terminal part (4) in the second position.

15 Claims, 4 Drawing Sheets

CONNECTING ASSEMBLY FOR A WINDSCREEN WIPER BLADE

Figure 1:
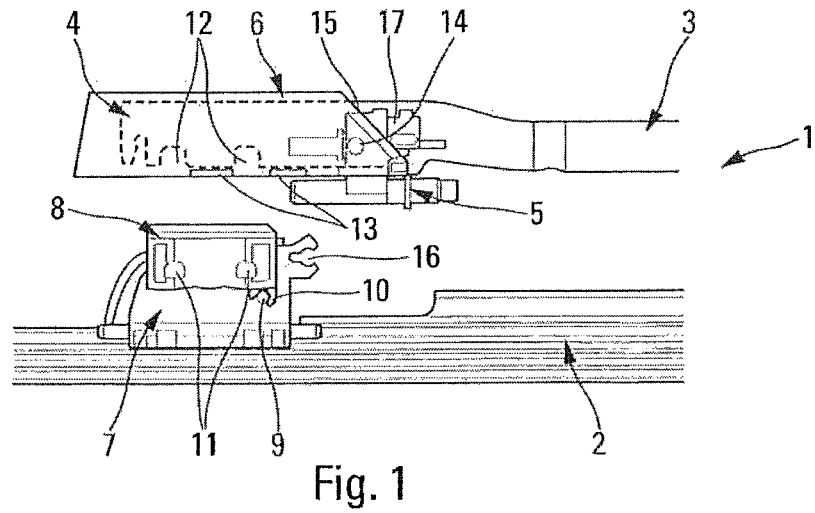

The field of the present invention is that of equipment for vehicles, and more particularly that of equipment for wiping the windows of motor vehicles.

Motor vehicles are normally fitted with windscreen wiper systems in order to wash the windscreen and prevent the view that the driver has of his environment from being disrupted. These windscreen wipers are conventionally driven by a wiper arm making an angular back-and-forth movement and comprising elongated wiper blades, themselves supporting scraper blades made of an elastic material. These blades brush against the windscreen and clear away the water moving it outside the field of vision of the driver. The wiper blades are made in the form either, in a conventional version, of articulated arms which hold the scraper blade in several discrete positions, or, in a more recent version called "flat blade", of a semi-rigid assembly which holds the scraper blade over its whole length. The arm is also called bow or lever in the automotive area. In both solutions, the wiper blade is attached to the rotating wiper arm of the windscreen wiper by an assembly consisting of a mechanical connector and an adapter. The mechanical connector is a part that is locked on the articulated arm or directly onto the flat blade, while the adapter is an intermediate part which allows the connector to be fixed to the wiper arm of the windscreen wiper. These two parts are connected to one another via a transverse spindle which allows their relative rotation in a plane perpendicular to the windscreen passing through the wiper arm.

It is also known to provide windscreen wiper systems with devices for conveying a windscreen-washing liquid which is brought from a tank situated on the vehicle and which is sprayed towards the windscreen by nozzles situated either around the windscreen or on the windscreen wiper itself for a better distribution of the liquid. In the case of nozzles placed on the wiper blades, the windscreen-washing liquid is brought, before being distributed between them, by piping elements that are fixed to the wiper arm of the windscreen wiper and that are connected to the distribution system of the wiper blade at the mechanical connector by a rigid part, called a hydraulic connector. These piping elements, which are usually flexible and two in number in order to ensure cleaning in both the outward and the backward directions of the wiper blade, lead into the hydraulic connector which is fixed to the mechanical connector by appropriate fittings and which ensures the necessary seal with it. The mechanical connector thus comprises orifices capable of accommodating, by a sealed connection, the said fittings of the hydraulic connector.

On particular vehicle models, there are also devices for heating the windscreen wiper in order to defrost the wiper blade in the event of severe cold and prevent it from sticking to the windscreen under the action of the frost. The heating function is also used to defreeze the channels for washing liquid. These devices, which are more specially adapted to flat blades, usually comprise a heating device integrated into the assembly that supports the scraper blade and on which electrical resistors are placed. They also require an electrical connection device capable of interacting with the mechanical connector in order to transmit to the heating device the electric current that comes from the vehicle. The electric connector is usually attached to the hydraulic connector before the latter is installed on the mechanical connector in order to be affixed thereon at the same time. Quick-connection devices then ensure contact between the pins of the electric connector and those of the mechanical connector and finally contact with the heating resistors of the assembly supporting the scraper blade.

In the document WO2012/072748, it is known to use an intermediate component in which the interfaces can be locked when changing the wiper blade. Nevertheless, in said wiping system, the adapter is locked on the arm through another component, more precisely a flexible flap linked to the adapter.

It is therefore important to insert and remove properly the hydraulic connector from the mechanical connector, while locking and unlocking the adapter on the arm with a less sophisticated solution. The same applies for the electrical interface to be provided between the pins of the electric connector and those of the mechanical connector.

The object of the present invention is to remedy these drawbacks while proposing a device making it possible to guide the hydraulic connector when it is inserted into the mechanical connector and to hold it in place on the arm when the blade is removed. This guidance function can also perform that of the electric connector when the latter is first mounted on the hydraulic connector.

Accordingly, the subject of the invention is an assembly for the production of a wiping system, comprising a terminal part of a wiper arm designed to move a wiper blade, and a connecting interface for conveying a liquid to the wiper blade, said assembly further comprising one sliding element having a first position for locking a connecting device of the wiper blade on said terminal part, and a second position enabling the terminal part and the connecting device to be separated, said sliding element being further able to hang said connecting interface either on the connecting device in the first position or on the terminal part in the second position.

Through one single component, it is therefore possible to lock the wiper blade on the arm and to connect or disconnect the connecting interface on the wiper blade. There is no need to use a flexible flap that is not reliable, nor a securing mean to prevent blade lose in case of flap break. Furthermore, the sliding element is easier to handle than a flap or other device, and is also more intuitive.

According to various embodiments of the invention that could be put together or separately:
- said first and second positions are two end positions of the sliding element,
- said terminal part comprises at least one first slot able to house an excrescence of said connecting device,
- the sliding element comprises at least one flap, the flap being able to lock the excrescence of said connecting device in said first slot when the sliding element is in the first position,
- the terminal part comprises a hook able to hang the connecting interface when the sliding element is in the second position,
- the connecting interface comprises a second slot able to host a hitch flap of the sliding element in order to shift the connecting interface between said first and second position,
- the sliding element comprises a pin able to hook an opening of the connecting interface in order to shift the connecting interface between said first and second position,
- the connecting interface comprises a pin able to hook an opening of the sliding element in order to be shifted between said first and second positions,
- the terminal part has a longitudinal slit allowing said pin to extend through it and to move along it, said slit is configured as an aperture provided on a lateral side of said terminal part, said aperture is open on a down edge of said terminal part all along a distance followed by said pin between said first and second position, said aperture is L shaped and opened on the down edge of said terminal part when said pin is in said second position, the sliding element is a cap covering the terminal part.

This invention also relates to a wiping system comprising a connecting device and an assembly as described previously.

According to various embodiments of the invention that could be put together or separately:

said connecting device comprises a mechanical connector linked to said wiper blade and an adapter, said mechanical connector being able to rotate relatively to said adapter together with the terminal part, the rotation occurring from a longitudinal position to an oblique position compared to the wiper arm, the connecting device comprises a notch for holding the connecting interface, the assembly is configured so that said hitch flap is hosted in said second slot when said wiper blade is in said longitudinal position, the assembly is configured so that said pin is hosted in said opening when said wiper blade is in said longitudinal position.

The invention will be better understood, and other objects, details, features and advantages of the latter will appear more clearly, during the detailed explanatory description that follows of several embodiments of the invention given as examples that are purely illustrative and not limiting, with reference to the appended schematic drawings.

Figure 2:
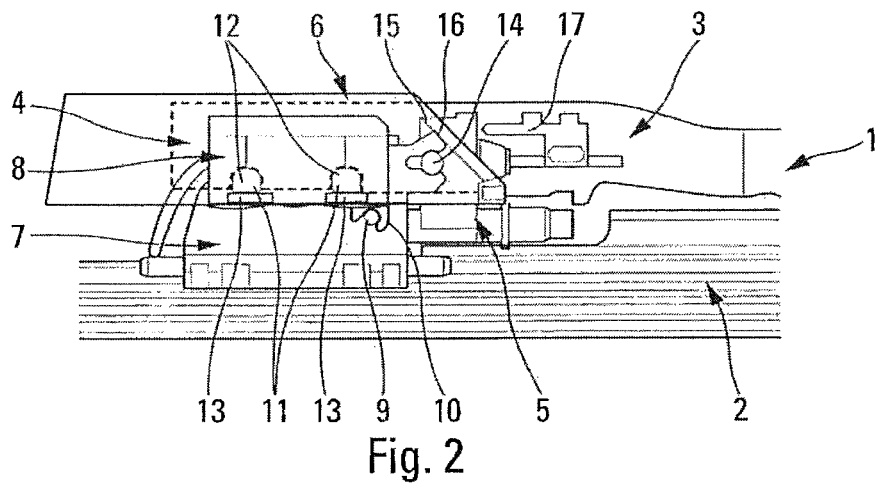
Figure 3:
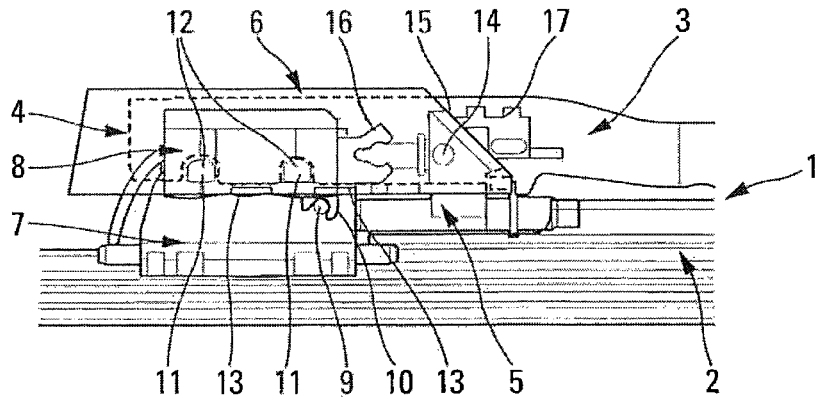
Figure 4:
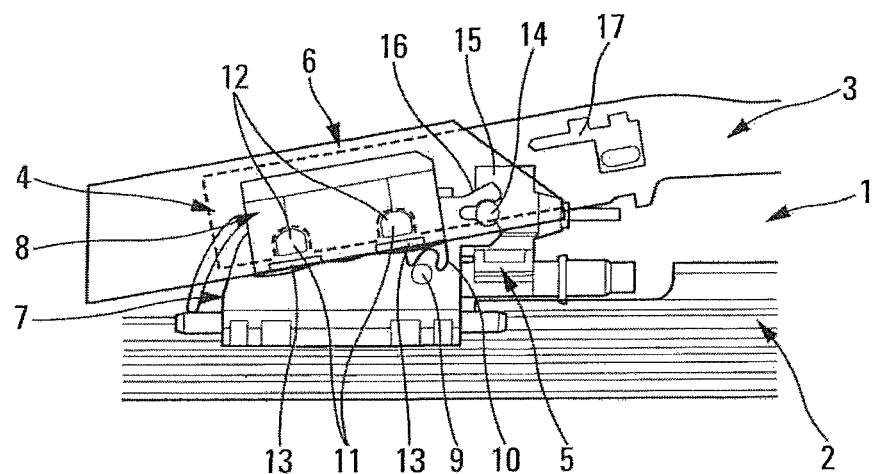
Figure 5:
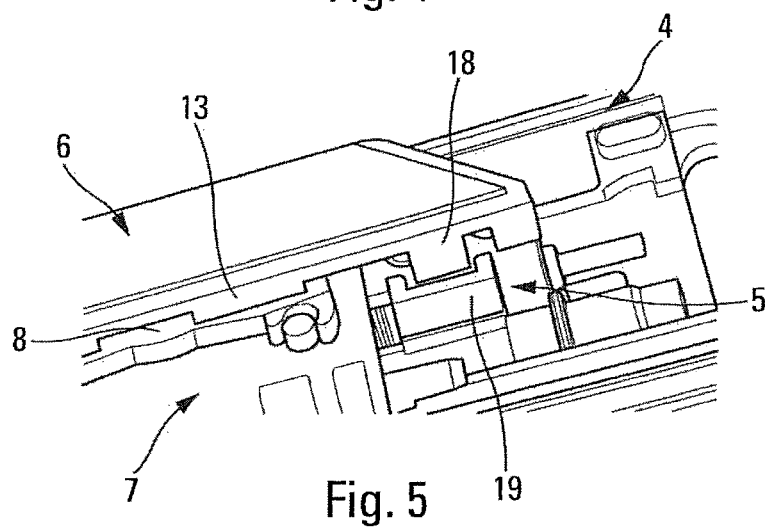
Figure 6:
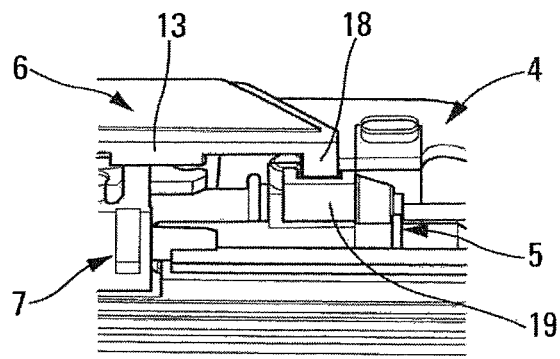
Figure 7:
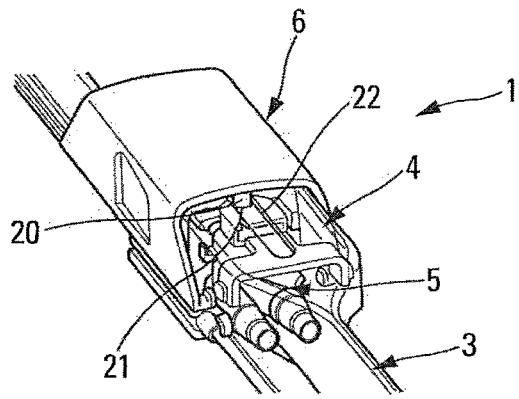
Figure 8:
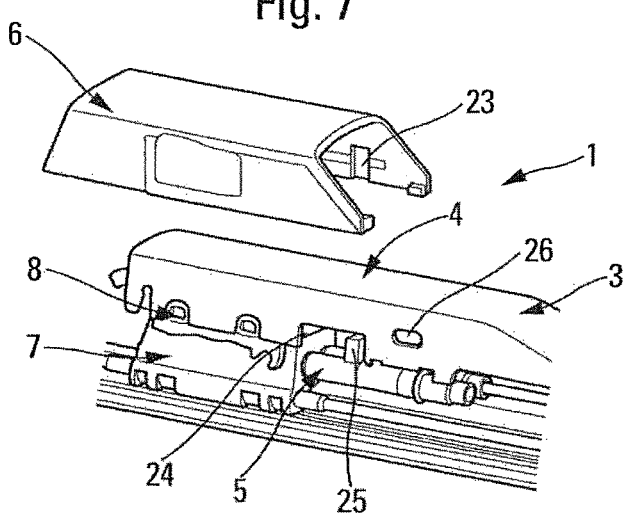
Figure 9:
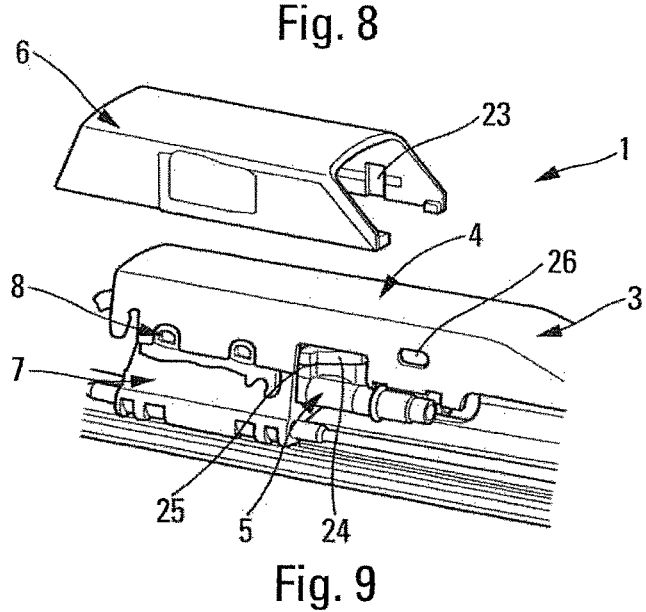
Figure 10:
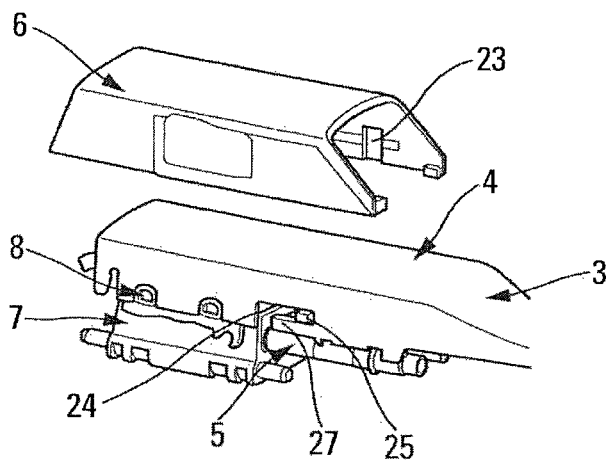
Figure 11:
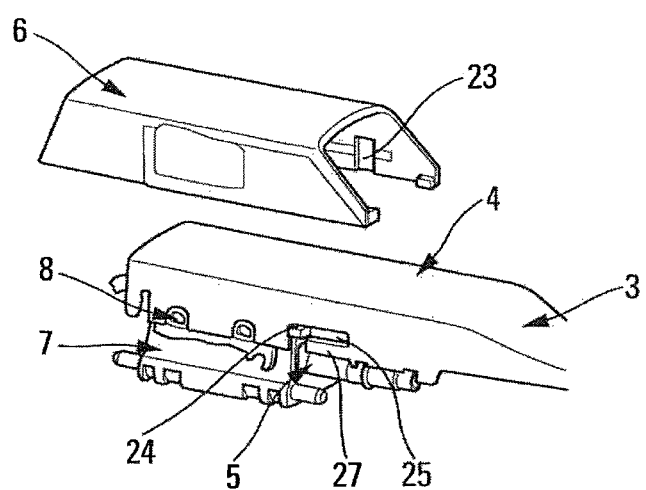

FIG. 1 is a side view illustrating a wiping system according to a first embodiment of the invention, when the wiper arm and the wiper blade are separated, FIG. 2 is a side view illustrating said wiping system when the wiper arm and the wiper blade are linked together, a sliding element thereof being in the first position, FIG. 3 is a side view illustrating said wiping system when the sliding element is in the second position, FIG. 4 is a side view illustrating said wiping system when the wiper arm is in an oblique position related to the wiper blade, FIG. 5 is a perspective view illustrating from below said wiping system, when said sliding element is linked to the adapter, FIG. 6 is a perspective view illustrating from below said wiping system, when said sliding element is linked to the adapter, in another embodiment of the invention, FIG. 7 is a partially exploded perspective view illustrating from behind said wiping system, when said sliding element is linked to the adapter, in another embodiment of the invention, FIG. 8 is a partially exploded perspective view illustrating said wiping system, when the connecting interface is in said second position, in another embodiment of the invention, FIG. 9 is a partially exploded perspective view illustrating said wiping system, when the connecting interface is in said first position, in the same embodiment as FIG. 8, FIG. 10 is a partially exploded perspective view illustrating said wiping system, when the connecting is in said second position, in another embodiment of the invention, FIG. 11 is a partially exploded perspective view illustrating said wiping system, when the connecting interface is in said first position, in the same embodiment as FIG. 10.

In the following description, same numerical references are used to designate same elements.

In the rest of the description, the term "longitudinal" refers to the orientation of the wiper blade which is mounted on the wiper arm. The longitudinal direction corresponds to the main axis of the wiper blade in which it extends.

FIGS. 1 to 4 show a wiping system 1 comprising a wiper blade 2 having a connecting device, a wiper arm 3 designed to move the wiper blade 2, and an assembly able to connect the connecting device on the wiper arm 3.

Said assembly comprises a terminal part 4 of the wiper arm 3, a connecting interface 5 and a sliding element 6. The connecting interface 5 is arranged inside the terminal part 4 of the wiper arm 3, and the terminal part 4 covers a part of the connecting device when they are put together.

The connecting interface 5 comprises an hydraulic connector for conveying a liquid to the wiper blade 2, and/or an electrical connector. The hydraulic connector has at least one piping element for said fluid, and the electrical connector is able to conduct power to heating elements in order to heat said fluid and hence said wiper blade 2 in case of freezing.

The connecting device comprises a mechanical connector 7 that is a part of said wiper blade 2, and an adapter 8 linked to the terminal part 4 in a removable way. The connecting device comprises also a transverse spindle, not showed on the figures, allowing the adapter 8 to rotate compared to the mechanical connector 7. The transverse spindle can be a part of, or can be integrated into the adapter or said mechanical connector. The spindle goes, for instance, through the mechanical connector 7 and the adapter 8, transversally to the longitudinal orientation of the wiper blade 2, and forms the link between the two pieces. Consequently, the wiper blade 2 is able to rotate relatively to said adapter 8 together with the terminal part 4 when they are linked together. The rotation can be performed from a longitudinal position to an oblique position, illustrated on FIG. 4, compared to the arm 3.

In order to keep an accurate longitudinal orientation, the connecting device is provided with at least a first pin 9 on the mechanical connector 7 and at least a first notch 10 on the adapter 8. The first pin 9 is able to fit in the first notch 10 to prevent the adapter 8 from rotating beyond the longitudinal position, and to keep the position stable for blade 2 assembly or disassembly from arm 2.

The FIG. 1 shows the wiping system when the terminal part 4 and the adapter 8 are separated, while the FIG. 2 shows the wiping system when the terminal part 4 and the adapter 8 are linked together. The terminal part 4 and the adapter 8 are linked or separated with an up and/or down movement action of each part, the adapter 8 being put into or out from the terminal part 4.

For fitting together, the adapter 8 has at least an excrescence 11, on his longitudinal side, and the terminal part 4 has at least a corresponding first slot 12. The excrescence 11 is able to be housed in the first slot 12 of the terminal part 4, in order to maintain the adapter 8 on the terminal part 4 with the help of the sliding element as will be explained below.

As shown on FIGS. 1 to 4, the sliding element 6 is a cap covering the terminal part 4, in a manner allowing it to slide longitudinally on the terminal part 4. The sliding element 6 is able to move between two end positions, a first position for locking the terminal part 4 on the adapter 8, and a second position enabling the terminal part 4 and the connecting device to be separated.

The FIG. 2 shows the wiping system 1 when the sliding element 6 is in the first position, the sliding element 6 being at the longitudinal end of the terminal part 4. The FIG. 3 shows the wiping system 1 when the sliding element 6 is in the second position, the sliding element 6 being in a central part of the terminal part 4.

On the FIGS. 1 to 4, the sliding element 6 comprises at least one flap 13, the flap 13 being able to lock the excrescence 11 of said connecting device in said first slot 12 of the terminal part 4. As a result, when the sliding element 6 is in the first position, the flap 13 closes the gap of the first slot 12 which opens on its lower side and lock the adapter 8 in the terminal part 4.

Otherwise, when the sliding element 6 is in the second position, the flap 13 is no longer in front of the gap, as illustrating on FIG. 3. Then, the excrescence 11 is no longer locked and the terminal part 4 is removable from the connecting device.

The sliding element 6 is further able to connect or disconnect the connecting interface 5 on the wiper blade 2 while the wiping system 1 is handled. Indeed, when the terminal part 4 and the connecting device are separated, the connecting interface 5 is kept on the terminal part 4. On the contrary, when the terminal part 4 and the connecting device are linked, the connecting interface 5 is connected to the connecting device in order to provide liquid and electrical current, while being free to move relative to the arm 3.

For that purpose, the sliding element 6 is able to hang the connecting interface 5 either on the connecting device or on the terminal part 4.

The connecting interface 5 is here provided in that view with at least a second pin 14 on a lateral side and/or a second notch 15 on the top.

The second pin 14 is fitted together with a third notch 16 of the mechanical connector 7 for holding the connecting interface 5 when the sliding element 6 is in the first position. The terminal part 4 comprises a hook 17 able to fit together with the second notch 15 for hanging the connecting interface 5 when the sliding element is in the second position. Alternatively the hook 17 could be provided on the connecting interface 5 and the second notch 15 on the terminal part 4.

A first embodiment of the invention is better illustrated on the FIG. 5. For shifting the connecting interface 5 between the first and second positions, the sliding element 6 comprises at least a hitch flap 18 and the connecting interface 5 comprises at least a second slot 19. The hitch flap 18 is arranged at the lower side of the sliding element 6, as for the flap 13 locking the adapter excrescence. The hitch flap 18 is able to be hosted in the second slot 19, in order to shift the connecting interface 5. Then, when the sliding element 6 is shifted between said first and second position, the connecting interface 5 follows the sliding element 6 movement and is either connected to or disconnected from the terminal part 4.

The second slot 19 hosted the hitch flap only if the adapter 8 is in the longitudinal direction. When the wiper arm 3 and the adapter 8 are in another position, the hitch flap 18 is not hosted in the second slot 19. Consequently, the sliding element 6 can't disconnect the connecting interface 5 from the connecting device, and the mechanical connector is free to rotate in said terminal part 4.

On FIG. 6, the hitch flap 18 is arranged at the end of the sliding element, so that the hitch flap 18 has also a stopper or tappet function that is performed by another element in the other embodiments. The stopper or tappet stops the sliding element 6 movement when it is moved from the first to the second position.

In a second embodiment illustrated on FIG. 7, the sliding element 6 comprises a third pin 20, extending from the top face of the sliding element 6 into the terminal part 4, and the connecting interface 5 comprises an opening 21. Said third pin 20 is able to hook the opening 21 in order to shift the connecting interface 5 between said first and second position of the sliding element 6.

The third pin 20 extends in the terminal part 4 through a longitudinal slit 22 provided on the upper face of the terminal part 4, in order to reach the opening 21 of the connecting interface 5. The third pin 20 can move along the slit 22 in order to shift the connecting interface 5 in the terminal part 4.

The third pin 20 is hosted in said opening 21 only if the adapter is in the longitudinal direction. When the wiper arm 3 and the adapter are in another position, the third pin 20 is not hosted in the opening 21. Consequently, the sliding element 6 can't disconnect the connecting interface 5 from the connecting device, and the mechanical connector is free to rotate in said terminal part 4.

In a same manner, the pin 20 could be arranged on the connecting interface 5 and the opening 21 into the sliding element 6.

FIGS. 8 to 11 illustrate another embodiment of the invention relating to the hang and displacement of the connecting interface 5. The sliding element 6 is showed away from the assembly 1 on these figures, in order to see some of internal features and the mechanism below it. Said connecting interface 5 has at least a second excrescence 25 or pin and the terminal part 4 has at least an aperture 24 provided on their lateral sides.

The second excrescence 25 is configured to move in the aperture 24 while the connecting interface 5 is linked or separated from the connecting device. The second excrescence 25 goes laterally beyond the aperture 24, outwardly from the terminal part 4. The sliding element 6 is provided with a hollow 23 or opening on the inward side face, for guiding the second excrescence 25, when the sliding element 6 surrounds the terminal part 4 in working use. Said second excrescence 25 is able to fit into the hollow 23. The hollow 23 may be blind or opened.

A first version illustrated on FIGS. 8 and 9, consists of an aperture 24 opened on the down edge of the arm side all along the distance between first and second position of the excrescence 25. As for the preceding embodiments, the assembly 1 needs the hook (numbered 17 on FIGS. 1 to 4), in this version. The hook hangs the connecting interface 5 when the sliding element is in the second position in order to avoid a fall of the connecting interface 5 from the arm 3. Said hook is kept in the terminal part 4 thanks to a teat 26 locked in the side of the terminal part 4. FIG. 8 shows the assembly 1 when the connecting interface 5 is disconnected from the connecting device, while FIG. 9 shows the assembly 1 when the connecting interface 5 is linked to the connecting device.

FIGS. 10 and 11 depict a second version consisting of an aperture 24 opened partially on the down edge of the terminal part 4 side and a connecting interface 5 having a thinner excrescence 25. The aperture 24 forms a L-shaped slit opened on the end of the small dash. The excrescence 25 slides along the large dash of the L between two positions, so that the connecting interface 5 is connected or not. This version allows to operate without the hook, the connecting interface 5 being kept in the terminal part 4 due to the down edge part 27 of the terminal part 4, the edge part 27 lining the large dash of the L. FIG. 10 shows the assembly 1 when the connecting interface 5 is disconnected from the connecting device, while FIG. 11 shows the assembly 1 when the connecting interface 5 is linked to the connecting device.

The invention claimed is:

1. An assembly forming part of a wiping system, comprising:
    a terminal part of a wiper arm designed to move a wiper blade;
    a connecting interface for conveying a liquid to the wiper blade; and
    one sliding element having a first position for locking a connecting device of the wiper blade on said terminal part, and a second position enabling the terminal part and the connecting device to be separated,
    said sliding element being configured to hang said connecting interface either on the connecting device in the first position or on the terminal part in the second position.

2. The assembly according to claim 1, wherein said first and second positions are two end positions of the sliding element.

3. The assembly according to claim 1, wherein said terminal part comprises at least one first slot able to house an excrescence of said connecting device.

4. The assembly according to claim 3, wherein the sliding element comprises at least one flap, the flap being able to lock the excrescence of said connecting device in said first slot when the sliding element is in the first position.

5. The assembly according claim 1, wherein the terminal part comprises a hook able to hang the connecting interface when the sliding element is in the second position.

6. The assembly according to claim 1, wherein the connecting interface comprises a second slot able to host a hitch flap of the sliding element in order to shift the connecting interface between said first and second position.

7. The assembly according to claim 1, wherein the sliding element comprises a pin able to hook an opening of the connecting interface in order to shift the connecting interface between said first and second position.

8. The assembly according to claim 7, wherein the terminal part has a longitudinal slit allowing the pin to extend through it and to move along it.

9. The assembly according to claim 1, wherein the connecting interface comprises a pin able to hook an opening of the sliding element in order to be shifted between said first and second positions.

10. The assembly according to claim 1, wherein the sliding element is a cap covering the terminal part.

11. A wiping system comprising a connecting device and an assembly according to claim 1.

12. The wiping system according to claim 11, wherein said connecting device comprises a mechanical connector linked to said wiper blade and an adapter, said mechanical connector being able to rotate relative to said adapter together with the terminal part, the rotation occurring from a longitudinal position to an oblique position compared to the arm.

13. The wiping system according to claim 11, wherein the connecting device comprises a notch for holding the connecting interface.

14. The wiping system according to claim 11, wherein
    the connecting interface comprises a second slot able to host a hitch flap of the sliding element in order to shift the connecting interface between said first and second position, and
    the assembly is configured so that said hitch flap is hosted in said second slot when said wiper blade is in a longitudinal position.

15. The wiping system according to claim 11, wherein
    the sliding element comprises a pin able to hook an opening of the connecting interface in order to shift the connecting interface between said first and second position, and
    the assembly is configured so that said pin is hosted in said opening when said wiper blade is in a longitudinal position.

* * * * *